US009138842B2

(12) United States Patent
Su et al.

(10) Patent No.: US 9,138,842 B2
(45) Date of Patent: Sep. 22, 2015

(54) PNEUMATIC IMPACT TOOL HAVING TWO OIL INLETS

(71) Applicant: BASSO INDUSTRY CORP., Taichung (TW)

(72) Inventors: San-Yih Su, Taichung (TW); Cheng-Wei Lai, Taichung (TW)

(73) Assignee: BASSO INDUSTRY CORP., Taichung (TW)

( * ) Notice: Subject to any disclaimer, the term of this patent is extended or adjusted under 35 U.S.C. 154(b) by 493 days.

(21) Appl. No.: 13/740,065

(22) Filed: Jan. 11, 2013

(65) Prior Publication Data

US 2013/0180749 A1 Jul. 18, 2013

(30) Foreign Application Priority Data

Jan. 16, 2012 (TW) ............................ 101200969 U

(51) Int. Cl.

*B23Q 11/10* (2006.01)
*B23Q 11/12* (2006.01)
*B23Q 5/04* (2006.01)
*B25B 21/02* (2006.01)

(52) U.S. Cl.

CPC .............. *B23Q 5/045* (2013.01); *B23Q 11/121* (2013.01); *B25B 21/02* (2013.01)

(58) Field of Classification Search

CPC .... B23Q 11/10; B23Q 11/1046; B23Q 11/12; B23Q 11/121; B23Q 5/045
USPC ............ 173/216, 213, DIG. 3; 184/6.12, 6.14
See application file for complete search history.

(56) References Cited

U.S. PATENT DOCUMENTS 2,457,893 A * 1/1949 Hlinsky ...................... 184/6.14
3,162,268 A * 12/1964 Short ............................... 184/5
3,376,939 A * 4/1968 Holzapfel .................... 173/201
3,719,254 A * 3/1973 Snider ............................ 184/64
4,403,679 A * 9/1983 Snider ............................ 184/64
5,363,723 A * 11/1994 Hoffman .................... 74/606 R
6,109,366 A * 8/2000 Jansson et al. ............... 173/216

* cited by examiner

*Primary Examiner* — Michelle Lopez
(74) *Attorney, Agent, or Firm* — Marger Johnson

(57) ABSTRACT

A pneumatic impact tool includes a housing, a power output unit, a transmission unit, and an oil seal assembly. The housing has first and second accommodating chambers, and first and second oil inlets in fluid communication with the first and second accommodating chambers, respectively, and permitting lubricating oil to be fed into the first and second accommodating chambers therethrough. The power output unit is centered at a Z-axis, and is disposed in the first accommodating chamber for power outputting. The transmission unit is centered at an X-axis, and is disposed in the second accommodating chamber for transmitting a power to the power output unit. The oil seal assembly prevents flow of the lubricating oil out of the first and second accommodating chambers.

10 Claims, 2 Drawing Sheets

PNEUMATIC IMPACT TOOL HAVING TWO OIL INLETS

CROSS-REFERENCE TO RELATED APPLICATION

This application claims priority of Taiwanese Application No. 101200969, filed on Jan. 16, 2012.

BACKGROUND OF THE INVENTION

1. Field of the Invention

This invention relates to a pneumatic tool, and more particularly to a pneumatic impact tool.

2. Description of the Related Art

Referring to FIG. 1, a conventional pneumatic impact tool 1 disclosed in US2011/0139474A1 includes a housing 11, a transmission unit 12 extending along an X-axis and disposed rotatably in the housing 11 for power transmission, and a power output unit 13 extending along a Z-axis, disposed rotatably in the housing 11, and geared to the transmission unit 12. The housing 11 has a first accommodating chamber 111 receiving the power output unit 13, a second accommodating chamber 112 receiving the transmission unit 12, and an oil inlet 113 in fluid communication with the second accommodating chamber 112 and permitting lubricating oil to be fed therethrough.

When the transmission unit 12 is driven by a power source (not shown), such as a pneumatic cylinder, to rotate, due to the geared connection between the transmission unit 12 and the power output unit 13, the power output unit 13 is rotated for outputting a power. The lubricating oil flows from the oil inlet 113 into clearances among the components of the transmission unit 12 in the second accommodating chamber 112, and subsequently into clearances among the components of the power output unit 13 in the first accommodating chamber 111. As such, all of the rotating members of the pneumatic tool 1 can be lubricated to facilitate smooth rotation thereof.

However, the lubricating oil is made of grease, and thus is difficult to flow. Hence, during rotation of the transmission unit 12 and the power output unit 13, the lubricating oil is easily thrown away from the transmission unit 12 and the power output unit 13, thereby resulting in high temperature effect and, thus, reduced viscosity of the lubricating oil. That is, the lubricating effect is reduced.

Importantly, since only one oil inlet 113 is provided, and since it is disposed at a side of the second accommodating chamber 112 distal from the first accommodating chamber 111, when the lubricating oil is fed into the second accommodating chamber 112, it is difficult to fill the first accommodating chamber 111, so that a large amount of lubricating oil needs to fill the second accommodating chamber 112 in order to be squeezed into the first accommodating chamber 111, thereby resulting in inconvenient oil filling and an increase in the demand quantity of the lubricating oil, which is not cost effective.

SUMMARY OF THE INVENTION

The object of this invention is to provide a pneumatic impact tool that can be filled with lubricating oil in a quick and uniform manner.

According to this invention, a pneumatic impact tool includes a housing, a power output unit, a transmission unit, and an oil seal assembly. The housing has first and second accommodating chambers, and first and second oil inlets in fluid communication with the first and second accommodating chambers, respectively, and permitting lubricating oil to be fed into the first and second accommodating chambers therethrough. The power output unit is centered at a Z-axis, and is disposed in the first accommodating chamber for power outputting. The transmission unit is centered at an X-axis, and is disposed in the second accommodating chamber for transmitting a power to the power output unit. The oil seal assembly prevents flow of the lubricating oil out of the first and second accommodating chambers.

Since the lubricating oil can be fed into the first and second accommodating chambers through the first and second oil inlets, respectively, it can flow quickly and uniformly into clearances among the above-mentioned components, so as to promote effectively the lubricating effect.

BRIEF DESCRIPTION OF THE DRAWINGS

These and other features and advantages of this invention will become apparent in the following detailed description of a preferred embodiment of this invention, with reference to the accompanying drawings, in which.

DETAILED DESCRIPTION OF THE PREFERRED EMBODIMENT

Figure 1:
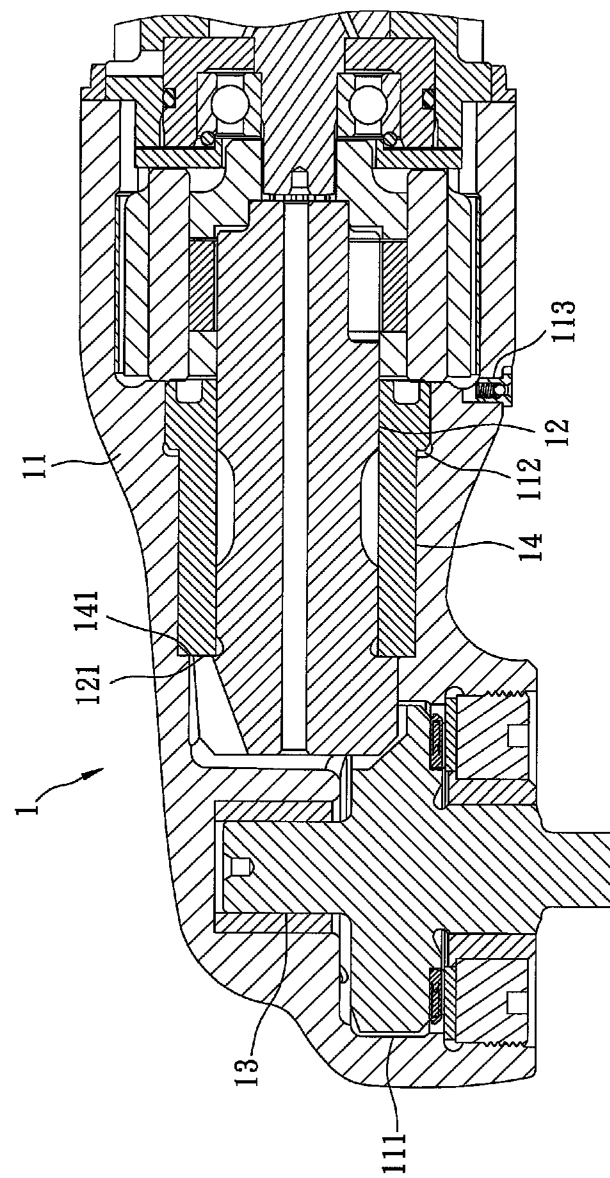
FIG. 1 is a fragmentary sectional view of a conventional pneumatic impact tool disclosed in US2011/0139474A1.
Figure 2:
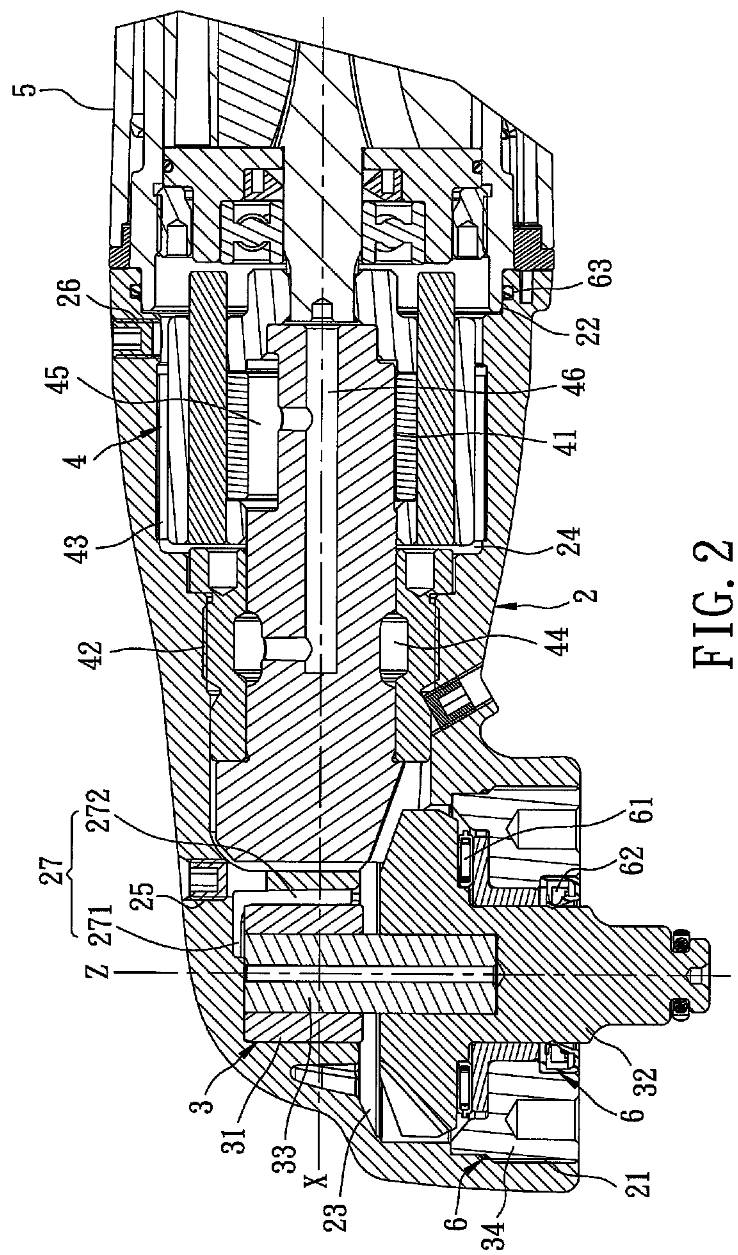
FIG. 2 is a fragmentary sectional view of the preferred embodiment of a pneumatic impact tool according to this invention.

Referring to FIG. 2, the preferred embodiment of a pneumatic impact tool according to this invention includes a housing 2, a power output unit 3, a transmission unit 4, a shell body 5, and an oil seal assembly.

The housing 2 has first and second openings 21, 22, first and second accommodating chambers 23, 24 disposed between the first and second openings 21, 22, first and second oil inlets 25, 26 in fluid communication with the first and second accommodating chambers 23, 24, respectively, and an L-shaped oil passage 27 in fluid communication with the first oil inlet 25. The oil passage 27 has a first passage portion 271 parallel to the X-axis, and a second passage portion 272 parallel to the Z-axis. The first oil inlet 25 is disposed between the first and second accommodating chambers 23, 24. The second oil inlet 26 is disposed at a side of the second accommodating chamber 24 distal from the first accommodating chamber 23. In this embodiment, the lubricating oil is an engine oil that has a low viscosity and that is easy to flow.

The power output unit 3 is centered at the Z-axis, is disposed rotatably in the first accommodating chamber 23 for power outputting, and includes a bushing 31 fixed in the housing 2, a rotating shaft 32 disposed rotatably in the housing 2, a spindle 33 disposed rotatably in the bushing 31 and extending into and coaxial with the rotating shaft 32, and a stop member 34 obstructing the rotating shaft 32 from moving away from the bushing 31.

The transmission unit 4 is centered at the X-axis, is disposed rotatably in the second accommodating chamber 24 for transmitting a power to the power output unit 3, and includes a main shaft 41 extending along the X-axis and geared to the rotating shaft 32, a bushing 42 sleeved around an end portion of the main shaft 41 and locked in the housing 2, a driving member 43 sleeved around an opposite end portion of the main shaft 41 and co-rotatable with the main shaft 41, e.g., by engagement between a key and a keyway, an annular first clearance 44 formed between the main shaft 41 and the bushing 42 and in fluid communication with the second oil inlet 26, an annular second clearance 45 formed between the main shaft 41 and the driving member 43 and in fluid communication with the second oil inlet 26, and an oil passing hole 46 formed in the main shaft 41, extending along the X-axis, and in fluid communication with the first and second clearances 44, 45. The bushing 43 is connected to the main shaft 41 in a known manner so as to obstruct the main shaft 41 from moving away from the power output unit 3. The driving member 43 is used to input a power to the main shaft 41.

The shell body 5 is connected to the housing 2 along the X-axis, and receives a power source (not shown) for supplying the power.

The oil seal assembly includes a first oil seal 61 disposed between the first opening 21 and the stop member 34, a second oil seal 62 disposed between the stop member 34 and the rotating shaft 32, and a third oil seal 63 disposed between the housing 2 and the shell body 5 and in the second opening 22. As such, the oil seal assembly can prevent the lubricating oil from flowing out of the first and second accommodating chambers 23, 24.

Since the lubricating oil has a low viscosity, and is easy to flow, when fed into the first and second accommodating chambers 23, 24 through the first and second oil inlets 25, 26, it flows from the first oil inlet 25 through the oil passage 27 and into the clearances between the spindle 33 and the bushing 31, between the spindle 33 and the rotating shaft 32, between the rotating shaft 32 and the main shaft 41, and between the rotating shaft 32 and the stop member 34, and flows from the second oil inlet 26 into the oil passing hole 46 through clearances between the main shaft 41 and the driving member 43, so as to lubricate clearances between the main shaft 41 and the bushing 42 and between the main shaft 41 and the housing 2.

Alternatively, two different lubricating oils can be fed respectively into the first and second oil inlets 25, 26. For example, an engine oil is fed into the first oil inlet 25, and grease is fed into the second oil inlet 26. If necessary, after a time period of use, the lubricating oil fed into the first or second oil inlet 25, 26 may be changed.

In view of the above, the pneumatic impact tool of this invention has the following advantages:

The lubricating oil can be an engine oil, which has a low viscosity and which is easy to flow. That is, the lubricating oil cannot be thrown away, and can avoid high temperature effect to prolong the service life thereof. Furthermore, this invention includes two oil inlets 25, 26 for feeding the lubricating oil, as well as an oil passing hole 46 and an oil passage 27 that are used to guide flow of the lubricating oil, such that all clearances among the above components can be filled quickly and uniformly with the lubricating oil. Consequently, the lubricating effect is improved effectively, and the demand quantity of the lubricating oil can be reduced significantly, which is cost effective and which results in convenient oil filling.

With this invention thus explained, it is apparent that numerous modifications and variations can be made without departing from the scope and spirit of this invention. It is therefore intended that this invention be limited only as indicated by the appended claims.

We claim:

1. A pneumatic impact tool comprising:

a housing having two openings, a first accommodating chamber, a second accommodating chamber, a first oil inlet, and a second oil inlet, said first and second accommodating chambers being disposed between said openings, said first and second oil inlets being in fluid communication with said first and second accommodating chambers, respectively, and being adapted to permit lubricating oil to be fed into said first and second accommodating chambers therethrough;

a power output unit centered at a Z-axis and disposed in said first accommodating chamber for power outputting;

a transmission unit centered at an X-axis perpendicular to the Z-axis and disposed in said second accommodating chamber for transmitting a power to said power output unit; and an oil seal assembly disposed in said housing for preventing flow of the lubricating oil out of said first and second accommodating chambers.

2. The pneumatic impact tool as claimed in claim 1, wherein said first oil inlet is disposed between said first and second accommodating chambers.

3. The pneumatic impact tool as claimed in claim 1, wherein said second oil inlet is disposed at a side of said second accommodating chamber distal from said first accommodating chamber.

4. The pneumatic impact tool as claimed in claim 1, wherein the lubricating oil is an engine oil.

5. The pneumatic impact tool as claimed in claim 1, wherein said power output unit includes a bushing fixed in said housing, a rotating shaft disposed rotatably in said housing and geared to said transmission unit, a spindle disposed rotatably within said bushing and extending into and coaxial with said rotating shaft, and a stop member obstructing said rotating shaft to move away from said bushing along the Z-axis, the lubricating oil being disposed among said bushing, said spindle, and said stop member.

6. The pneumatic impact tool as claimed in claim 5, wherein said oil seal assembly includes a first oil seal disposed between said first opening and said stop member, and a second oil seal disposed between said stop member and said rotating shaft.

7. The pneumatic impact tool as claimed in claim 5, wherein said housing further has an L-shaped oil passage in fluid communication with said first oil inlet and having a first passage portion parallel to the X-axis, and a second passage portion in fluid communication with said first passage portion and parallel to the Z-axis, so that the lubricating oil can flow from said first oil inlet into clearances between said spindle and said bushing, between said rotating shaft and said transmission unit, and between said spindle and said rotating shaft through said oil passage.

8. The pneumatic impact tool as claimed in claim 1, wherein said transmission unit includes a main shaft, a bushing, and a driving member, said main shaft extending along the X-axis and being geared to said power output unit, said bushing being sleeved around an end portion of said main shaft and being locked in said housing for obstructing said main shaft from moving away from said power output unit, said driving member being sleeved around an opposite end portion of said main shaft and being co-rotatable with said main shaft, such that the lubricating oil is disposed among said main shaft, said bushing, and said driving member.

9. The pneumatic impact tool as claimed in claim 8, further comprising a shell body connected to said housing, said oil seal assembly including an oil seal disposed between said housing and said shell body and in one of said openings.

10. The pneumatic impact tool as claimed in claim 8, wherein said transmission unit further includes an annular first clearance formed between said main shaft and said bushing and in fluid communication with said second oil inlet, and an annular second clearance formed between said main shaft and said driving member and in fluid communication with said second oil inlet, and an oil passing hole formed in said main shaft and in fluid communication with said first and second clearances, such that the lubricating oil can flow from said second oil inlet into said first and second clearances and said oil passing hole.

* * * * *